US012298698B2

(12) United States Patent
Yokota

(10) Patent No.: US 12,298,698 B2
(45) Date of Patent: May 13, 2025

(54) IMAGE FORMING APPARATUS

(71) Applicant: CANON KABUSHIKI KAISHA, Tokyo (JP)

(72) Inventor: Akinori Yokota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 17/850,731

(22) Filed: Jun. 27, 2022

(65) Prior Publication Data

US 2023/0004114 A1 Jan. 5, 2023

(30) Foreign Application Priority Data

Jun. 30, 2021 (JP) ................................ 2021-109226

(51) Int. Cl.
*G03G 15/00* (2006.01)
*B65H 31/26* (2006.01)

(52) U.S. Cl.
CPC ......... *G03G 15/6552* (2013.01); *B65H 31/26* (2013.01); *B65H 2405/10* (2013.01)

(58) Field of Classification Search
CPC .... G03G 15/00; G03G 15/65; G03G 15/6552; B65H 31/00; B65H 31/26; B65H 2405/10
See application file for complete search history.

(56) References Cited

U.S. PATENT DOCUMENTS

2017/0308027 A1* 10/2017 Tanaka .................. G03G 15/60

FOREIGN PATENT DOCUMENTS

JP H01132646 U 9/1989
JP H10-207321 A 8/1998
JP 2004196515 A 7/2004
JP 2004323131 A 11/2004
JP 2005350182 A 12/2005
JP 2007106524 A 4/2007
JP 2007124427 A 5/2007
JP 2007-217165 A 8/2007
JP 2008-001485 A 1/2008
JP 2009-214948 A 9/2009
JP 2010105792 A 5/2010
JP 2013073120 A * 4/2013 ............ G03G 15/00
JP 2016030668 A 3/2016
JP 2017-196769 A 11/2017
JP 2020-154300 A 9/2020

* cited by examiner

*Primary Examiner* — Nguyen Q. Ha
(74) *Attorney, Agent, or Firm* — Canon U.S.A., Inc. IP Division

(57) ABSTRACT

An image forming apparatus includes an apparatus main body, an output tray, and a holding member. The output tray is rotatable about a first rotation shaft between a closed position and an open position. The holding member is rotatable about a second rotation shaft. The output tray comes into contact with the holding member halfway through rotation of the output tray from the closed to the open position. When the output tray is rotated to the open position, the holding member rotates to a retracted position while being in contact with the output tray. When viewed in a direction crossing a recording-material discharge direction, the first rotation shaft is located downstream from the second rotation shaft in the discharge direction, and a center of gravity of the holding member is located downstream from the second rotation shaft in the discharge direction when the holding member is at the retracted position.

28 Claims, 16 Drawing Sheets

IMAGE FORMING APPARATUS

BACKGROUND

Field

The present disclosure relates to image forming apparatuses that form an image on a recording material.

Description of the Related Art

Known image forming apparatuses in the relate art, such as printers, discharge a sheet on which an image is formed onto an output tray provided at the top of the main body of the apparatus. A fixing process for fixing the image on the sheet with heat or pressure may curl the sheet to be discharged onto the output tray. The curled sheet influences the load performance. Because of this, known image forming apparatuses include a holding member that presses down the sheet discharged onto the output tray from above.

Japanese Patent Laid-Open No. 2004-323131 discloses a configuration in which the holding member is slidable to prevent the output tray and the holding member from interfering when the output tray is opened to damage the holding member.

The slidable holding member needs a space for the holding member in the apparatus main body, which leads to an increase in the size of the apparatus. This configuration further needs an additional member, such as a coil spring, for urging the holding member, so that the retracted holding member automatically returns to the original position when the output tray is closed.

It is also possible to prevent the interference between the output tray and the holding member by limiting the amount of rotation of the output tray. However, this configuration reduces the space in the apparatus main body for the user to access, resulting in a decrease in usability.

SUMMARY

The present disclosure provides an image forming apparatus in which the usability is improved without increasing the size of the apparatus.

According to an aspect of the present disclosure, an image forming apparatus includes an apparatus main body including a discharge port for discharging a recording material on which an image is formed, an output tray configured to support the recording material discharged from the discharge port, and a holding member configured to hold the recording material supported by the output tray from above in a vertical direction, wherein the output tray is rotatable with respect to the apparatus main body about a first rotation shaft extending in a crossing direction crossing a discharge direction in which the recording material is discharged from the discharge port, wherein the output tray is rotatable between a closed position at which the output tray is closed with respect to the apparatus main body and an open position at which the output tray is open with respect to the apparatus main body, wherein the holding member is rotatable with respect to the apparatus main body about a second rotation shaft extending in the crossing direction, wherein the output tray comes into contact with the holding member halfway through rotation of the output tray from the closed position to the open position, and when the output tray is rotated to the open position, the holding member rotates to a retracted position while being in contact with the output tray, and wherein, when viewed in the crossing direction, the first rotation shaft is located downstream from the second rotation shaft in the discharge direction, and a center of gravity of the holding member is located downstream from the second rotation shaft in the discharge direction when the holding member is at the retracted position.

Further features of the present disclosure will become apparent from the following description of exemplary embodiments with reference to the attached drawings.

DESCRIPTION OF THE EMBODIMENTS

First Embodiment

Overall Configuration of Image Forming Apparatus

The configuration of an image forming apparatus 100 of this embodiment will be described. The image forming apparatus 100 of this embodiment is an electrophotographic monochrome laser printer, which forms an image on a sheet S (a recording material) with toner (developer) according to image information transmitted from an external device, such as a personal computer.

In the following description, the height direction (the vertical direction) of the image forming apparatus 100 installed on a horizontal surface is the Z-direction. The direction crossing the Z-direction and parallel to the axis of rotation (the main scanning direction) of a photosensitive drum 101 (described later) is the X-direction. The direction crossing the X-direction and the Z-direction is the Y-direction. The X-direction, the Y-direction, and the Z-direction may cross each other at right angles. In the X-direction, the positive side is referred to as "the right", and the negative side is referred to as "the left". In the Y-direction, the positive side is referred to as "front", and the negative side is referred to as "back" or "rear". In the Z-direction, the positive side is referred to as "upper side", and the negative side is referred to as "lower side" for the sake of convenience.

Figure 1:
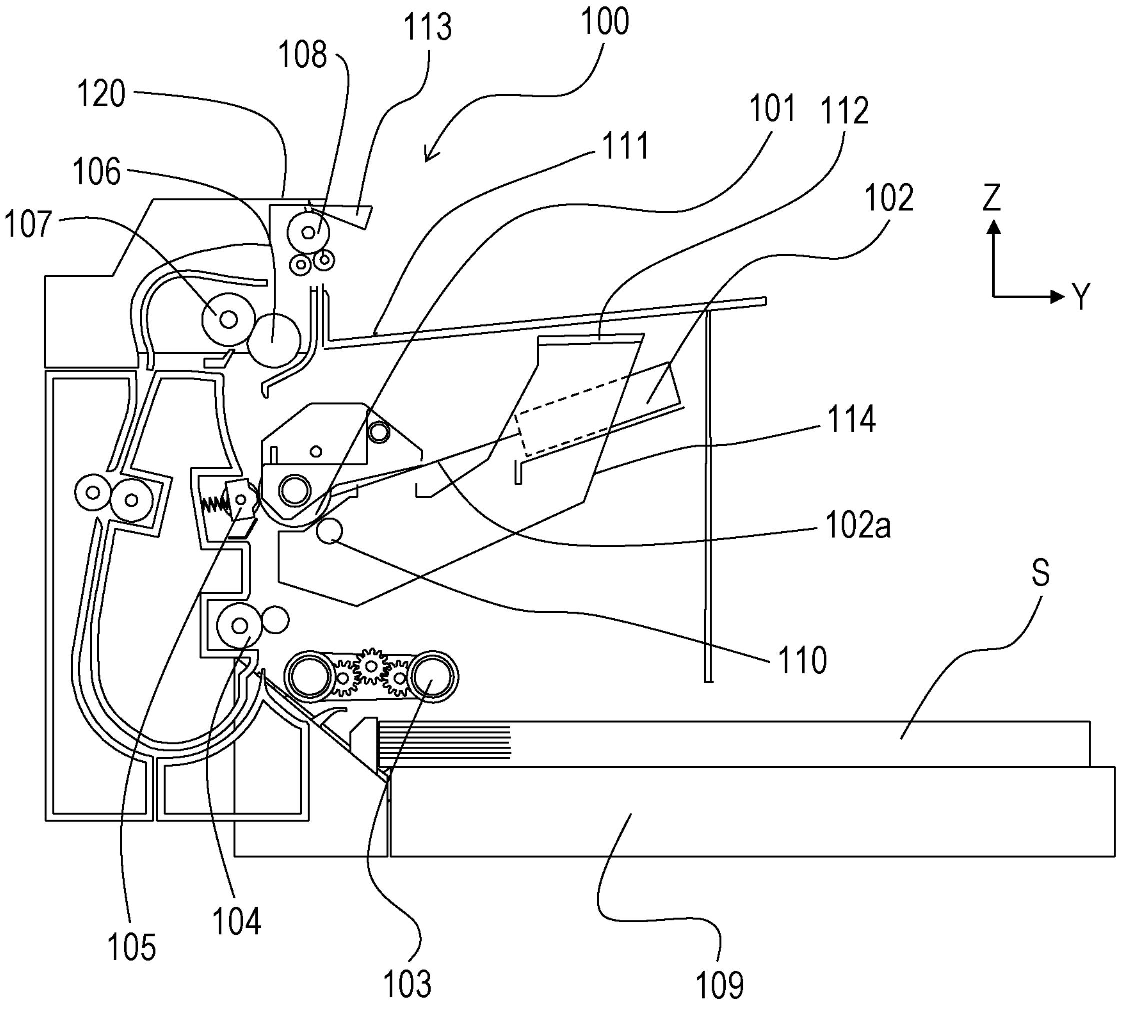
FIG. 1 is a diagram showing the overall configuration of an image forming apparatus of an embodiment.

FIG. 1 is a cross-sectional view of the image forming apparatus 100 of this embodiment. As shown in FIG. 1, the photosensitive drum (an image bearing member) 101 is irradiated with a laser beam 102*a* from a laser scanner unit (an optical scanner) 102 according to image information to form a static latent image on the photosensitive drum 101. This static latent image is developed as a toner image with toner contained in a container 114 by a developing roller 110. The image forming apparatus 100 of this embodiment employs a supply configuration in which toner can be supplied to the container 114 from the outside through a supply port 112. This configuration will be described in detail later.

Sheets S housed in a sheet feed tray 109 are fed by a sheet feeding roller 103 so as to be separated into individual pieces by a separating unit (not shown). The sheet S is conveyed to a transfer nip between the photosensitive drum 101 and a transfer roller 105 by a conveying roller 104, and the toner image is transferred. The sheet S to which the toner image is transferred is conveyed to a fixing nip between a heater 106 and a pressing roller 107, where the sheet S is heated and pressed, so that the toner image is fixed to the sheet S. The sheet S on which the image is formed is discharged to an output tray 111 provided on the top of an apparatus main body 120 by a discharge roller 108.

Configuration of Output Tray

Figure 2A:
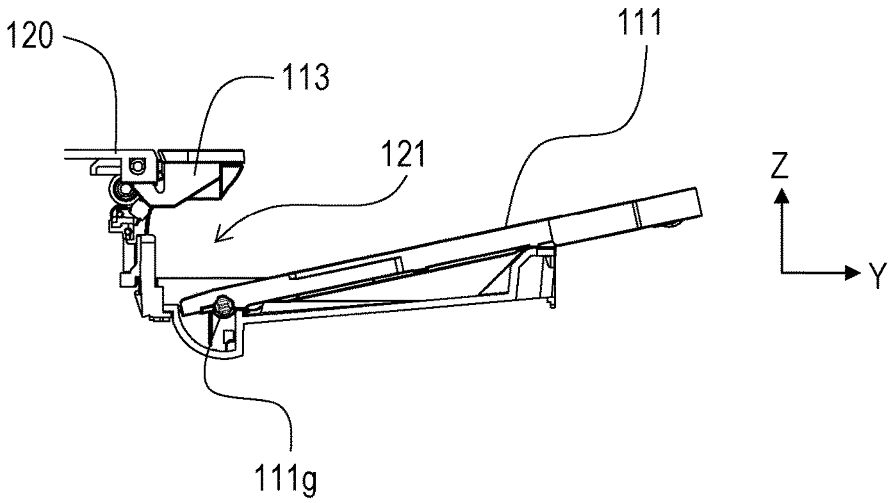
FIGS. 2A and 2B are side views of an output tray according to an embodiment.
Figure 2B:
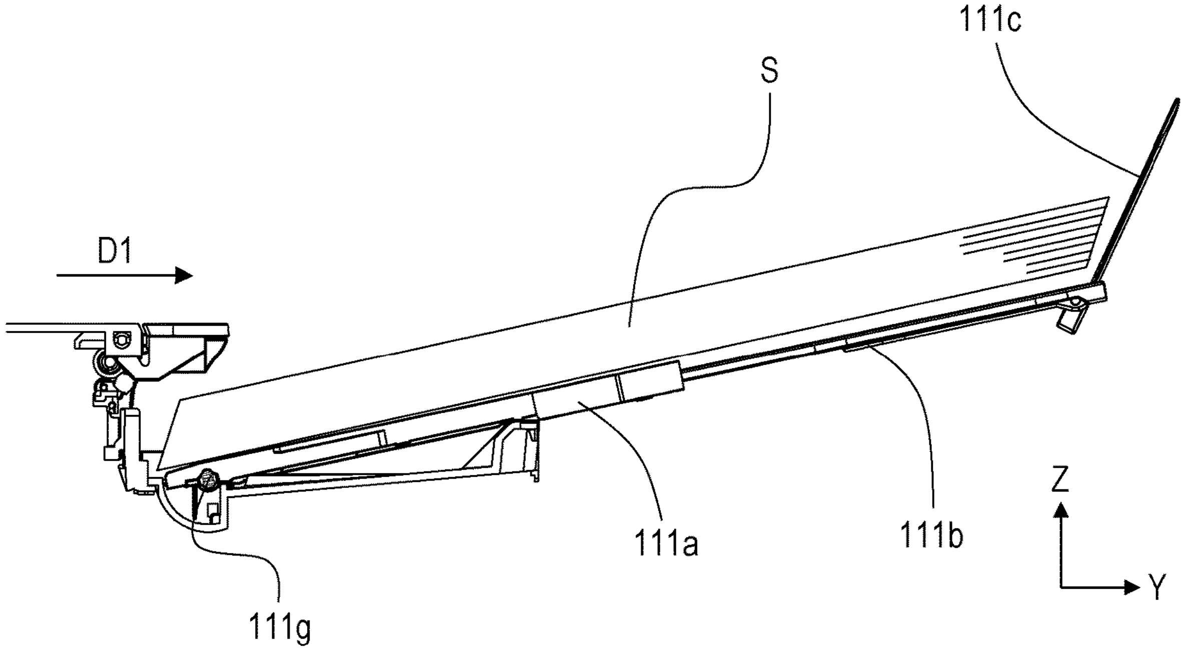

FIGS. 2A and 2B are enlarged cross-sectional views of the output tray 111 of this embodiment. The output tray 111 includes three components, a first output tray 111*a*, a second output tray 111*b*, and a third output tray 111*c*. The output tray 111 supports the sheet S discharged from a discharge port 121 of the apparatus main body 120 (also referred to as "casing"). Arrow D1 indicate a discharge direction in which the sheet S is discharged from the discharge port 121. A holding member 113 that presses down the sheet S from above in the vertical direction is provided near the discharge port 121. The details of the holding member 113 will be described later.

FIG. 2A illustrates the output tray 111 in a retracted state. FIG. 2B illustrates the output tray 111 in a developed state. The second output tray 111*b* and the third output tray 111*c* can be housed in the first output tray 111*a*, as shown in FIG. 2A, when the image forming apparatus 100 is packed or is not to be used. When the image forming apparatus 100 is to be used, the user develops the second output tray 111*b* and the third output tray 111*c*, as shown in FIG. 2B. This increases the area of the output tray 111, allowing stably supporting the sheets S. Tilting the third output tray 111*c* at a predetermined angle, as shown in FIG. 2B, allows aligning the position of the leading ends of the discharged sheets S (the downstream ends of the sheets S in the discharge direction D1). This prevents the position of the stacked sheets S from shifting significantly in the discharge direction D1.

Figure 3A:
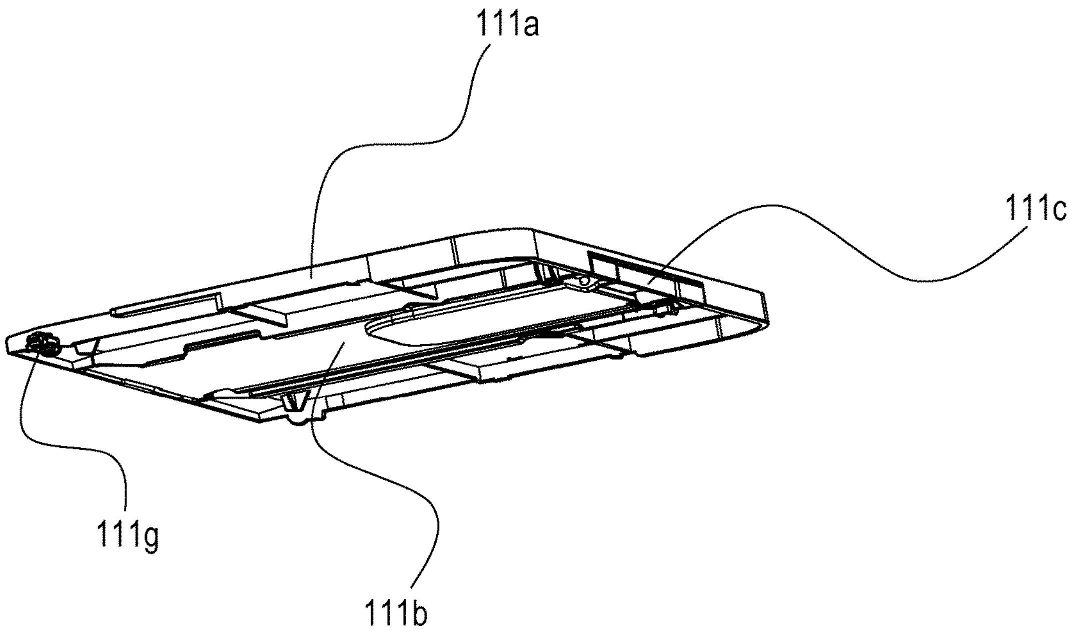
FIGS. 3A and 3B are perspective views of the output tray.
Figure 3B:
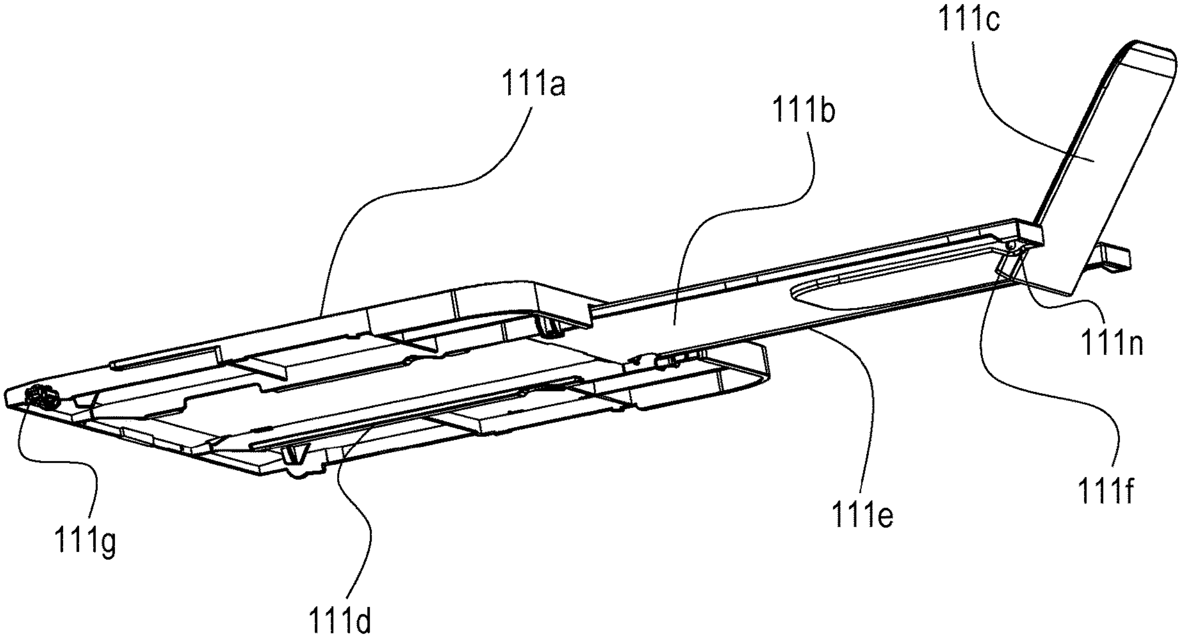

Referring next to FIGS. 3A and 3B, the procedure for developing the second output tray 111*b* and the third output tray 111*c* will be described. FIGS. 3A and 3B are perspective views of the output tray 111 of this embodiment. FIG. 3A illustrates the output tray 111 in the retracted state, and FIG. 3B illustrates the output tray 111 in the developed state, as in FIGS. 2A and 2B.

As shown in FIG. 3B, the first output tray 111*a* includes rails 111*d* for slidably holding the second output tray 111*b* inside thereof. The side edges 111*e* of the second output tray 111*b* slide along the rails 111*d*, so that the second output tray 111*b* is held so as to be slidable along the first output tray 111*a*. The third output tray 111*c* has a rotation shaft 111*f*. The rotation shaft 111*f* is supported by a rotation-shaft supporting portion 111*n* of the second output tray 111*b* so that the third output tray 111*c* is held so as to be rotatable with respect to the second output tray 111*b*. The third output tray 111*c* has a rotation restricting unit (not shown) so as not to rotate further from the state shown in FIG. 3B.

Thus, when developing the second output tray 111*b* and the third output tray 111*c*, the user first draws the second output tray 111*b* from the first output tray 111*a* and rotates the third output tray 111*c* with respect to the second output tray 111*b*. The discharged sheets S can be received even if the third output tray 111*c* is nor rotated.

As shown in FIGS. 2A and 2B and FIGS. 3A and 3B, the output tray 111 is configured to rotate about a rotation shaft 111*g* (a first rotation shaft) with respect to the apparatus main body 120. Opening the output tray 111 with respect to the apparatus main body 120 allows exposing the supply port 112 for supplying toner, described above, to the outside of the apparatus main body 120.

Figure 4A:
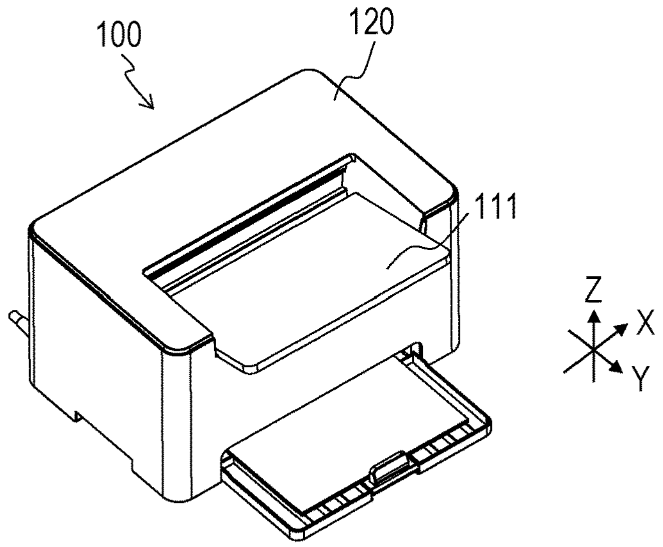
FIGS. 4A to 4C are perspective views of the image forming apparatus of this embodiment illustrating the procedure for attaching a supply pack.
Figure 4B:
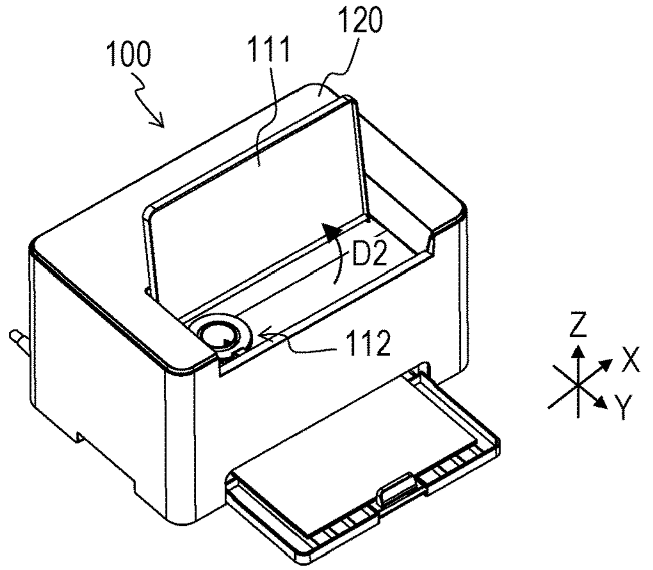
Figure 4C:
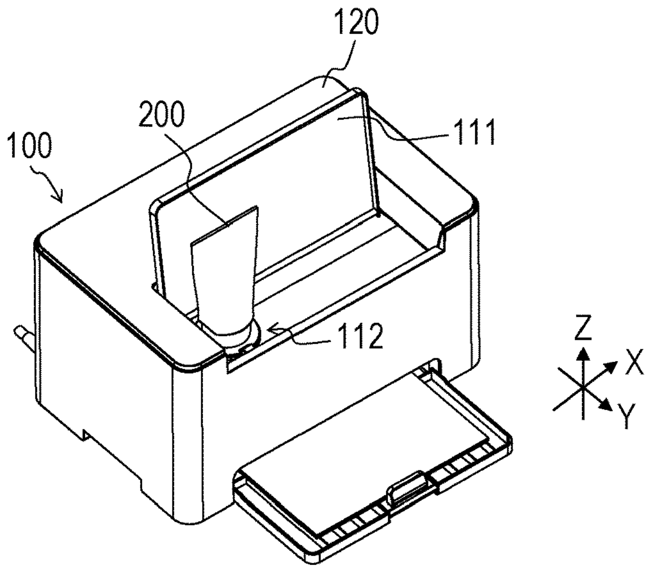

FIGS. 4A to 4C are perspective views of the image forming apparatus 100 of this embodiment. FIG. 4A illustrates a state in which the output tray 111 is at the closed position with respect to the apparatus main body 120. FIG. 4B illustrates a state in which the output tray 111 is rotated in the direction of arrow D2 with respect to the apparatus main body 120 into the open position with respect to the apparatus main body 120.

FIG. 4B shows that the supply port 112 is exposed to the outside by opening the output tray 111. When the amount of toner remaining in the toner container 114 decreases, the user attaches a toner supply pack 200 (a supply container) to the supply port 112 to thereby supply toner to the container 114. FIG. 4C illustrates a state in which the supply pack 200 is attached to the supply port 112.

Configuration of Holding Member

Next, the configuration of the holding member 113 will be described. As described above, the image forming apparatus 100 of this embodiment fixes a toner image to the sheet S by heating and pressing the sheet S with the heater 106 and the pressing roller 107, respectively. At the fixing process, the edge of the sheet S may be curled.

The curl of the discharged sheet S, if the following sheet S is discharged, causes the following sheet S to get into the preceding sheet S or the sheet S placed on the output tray 111 to be pushed out, decreasing the sheet S stack performance.

For this reason, this embodiment includes the holding member 113 near the discharge port 121 so that the curled sheet S can be pressed down from above by the holding member 113.

Figure 5A:
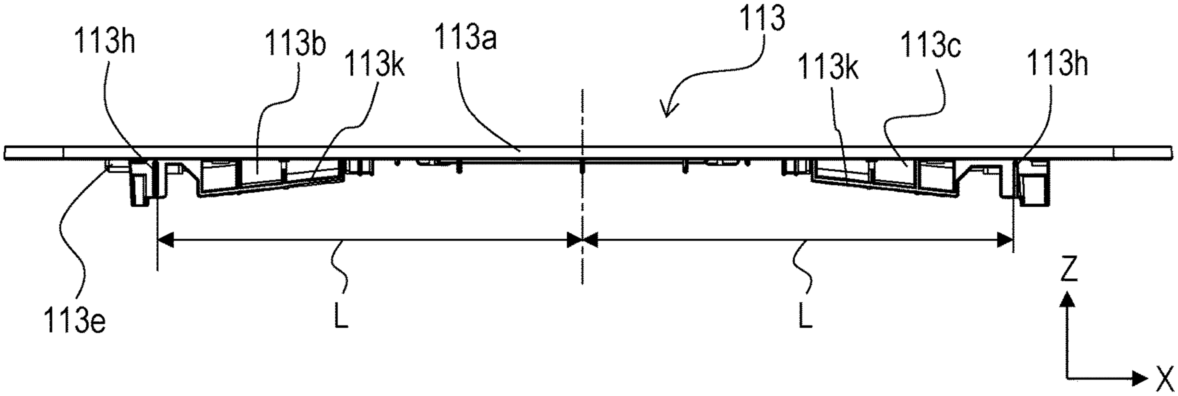
FIGS. 5A to 5C are diagrams illustrating the configuration of a holding member according to a first embodiment.
Figure 5B:
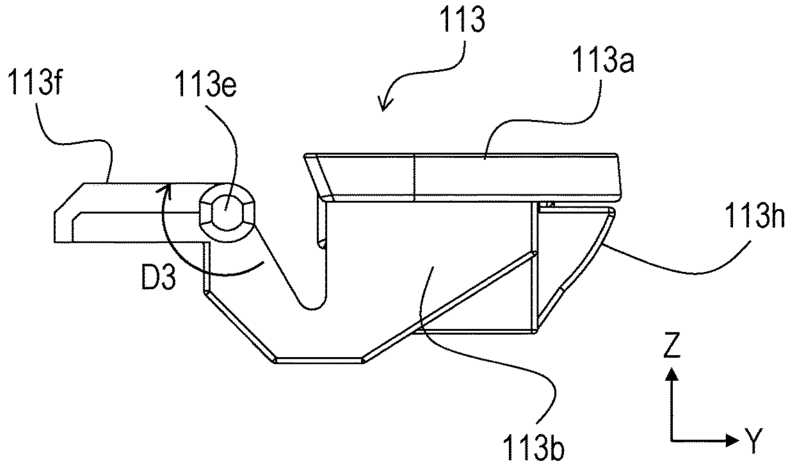
Figure 5C:
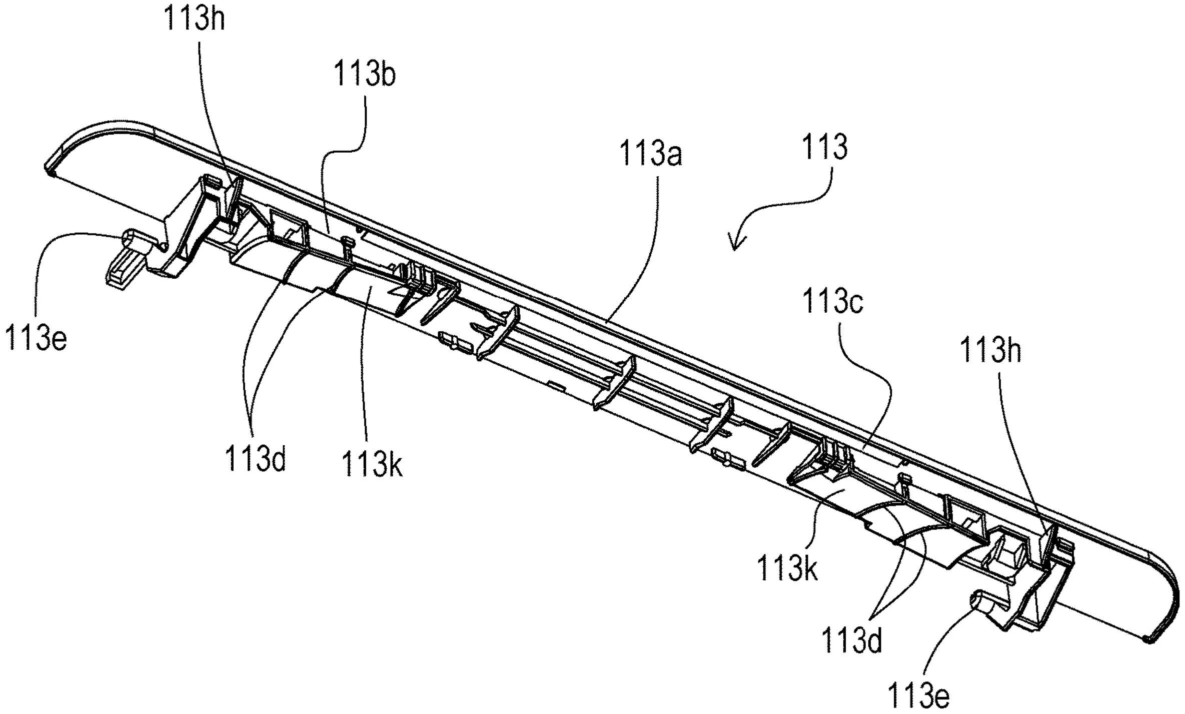

FIGS. 5A to 5C are diagrams illustrating the configuration of the holding member 113 of this embodiment. FIG. 5A is a front view of the holding member 113, FIG. 5B is a left side view of the holding member 113, and FIG. 5C is a perspective view of the holding member 113.

As shown in FIG. 5A, the holding member 113 includes three components, a first holding member 113*a*, a second holding member 113*b*, and a third holding member 113*c*.

The second and third holding members 113*b* and 113*c* each have a sheet holding surface 113*k*, which is inclined in the width direction of the sheet S (X direction). As shown in FIG. 5C, each sheet holding surface 113*k* has several ribs 113*d* with a height of about 1 mm protruding from the sheet holding surface 113*k*. The ribs 113*d* come into contact with the discharged sheet S to hold the sheet S.

The reason why the ribs 113*d* are provided to prevent the entire sheet holding surface 113*k* from coming into contact with the sheet S is to prevent drops of water condensed on the sheet holding surface 113*k* from attaching to the sheet S. The fixing process causes moisture contained in the sheet S to evaporate and rise as water vapor. The water vapor is cooled on the sheet holding surface 113*k*, and the drops of water attach to the sheet holding surface 113*k*. For this reason, decreasing the area of the sheet holding surface 113*k* that comes into contact with the sheet S as much as possible prevents the drops of water from attaching to the sheet S.

As shown in FIG. 5B, the holding member 113 is supported by the apparatus main body 120 so as to be rotatable about rotation shafts 113*e* (a second rotation shaft). The second and third holding members 113*b* and 113*c* each include a rotation stopper 113*f*. The rotation stoppers 113*f* butt against part of the apparatus main body 120 (not shown in FIG. 5B) to restrict the rotation range of the holding member 113 to prevent the holding member 113 from rotating in the direction of arrow D3.

As shown in FIGS. 5A to 5C, the holding member 113 includes contact portions 113*h* at opposite ends. When the output tray 111 rotates, the holding member 113 comes into contact with the output tray 111 via the contact portions 113*h*, which will be described in detail later. The contact portions 113*h* are disposed outside the sheet-S conveying area in the width direction of the sheet S (the X direction), so that the contact portions 113*h* do not come into contact with the sheet S. As shown in FIG. 5A, the contact portions 113*h* may be disposed distance L=108 mm or more away from the center of conveyance of the sheet S. The distance 108 mm is given for mere illustration and may be changed as appropriate according to the maximum size of the sheet S that the image forming apparatus 100 can support.

Configuration in which Output Tray and Holding Member Rotate Cooperatively

Next, how the output tray 111 and the holding member 113 rotate together will be described.

Figure 6A:
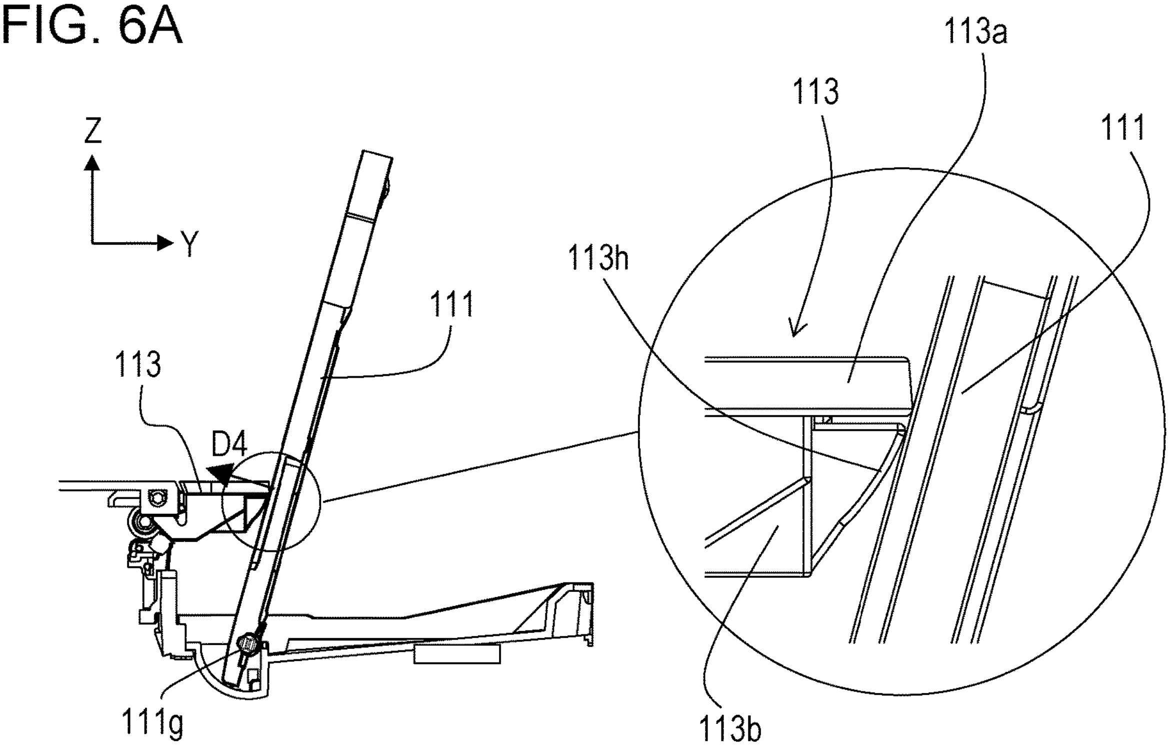
FIGS. 6A and 6B are diagrams illustrating a state in which the output tray and the holding member of the first embodiment rotate together.
Figure 6B:
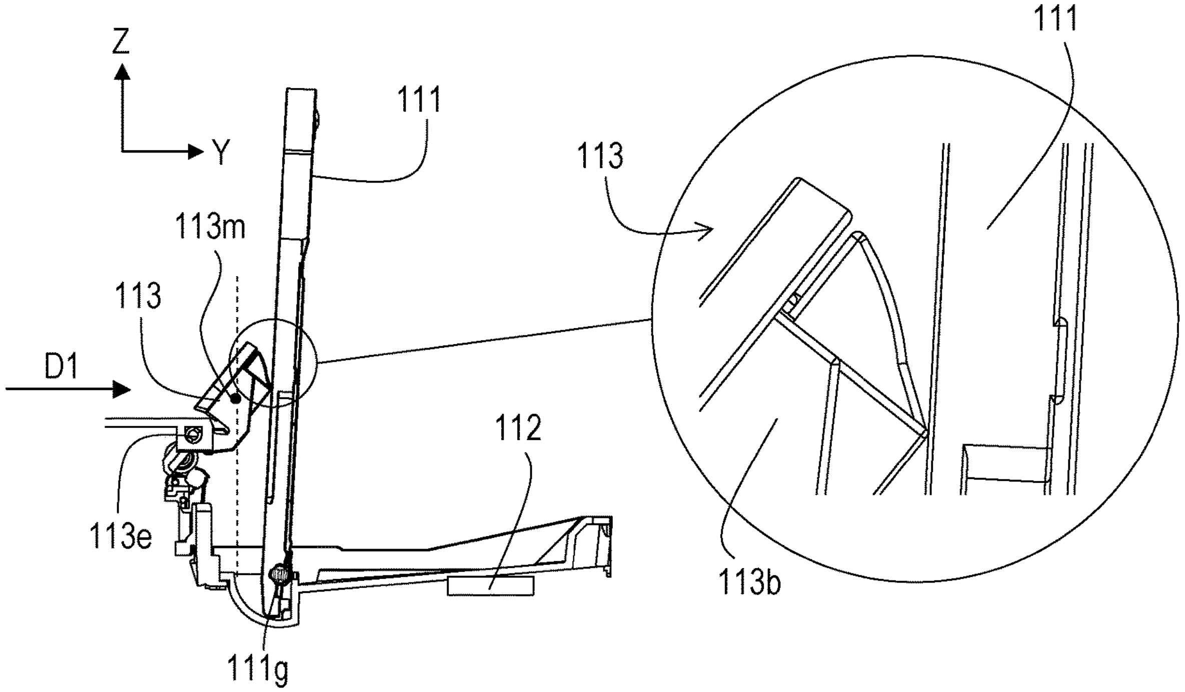

FIG. 6A illustrates a state in which the output tray 111 comes into contact with the holding member 113 in the process of rotation from the closed position to the open position. FIG. 6B illustrates a state in which the output tray 111 is opened to the open position.

As shown in FIG. 6A, when the user rotates the output tray 111, the output tray 111 first comes into contact with the end of the first holding member 113*a* and shortly thereafter comes into contact with the contact portions 113*h* provided at the second and third holding members 113*b* and 113*c*. The holding member 113 given a force in the direction of arrow D4 by the output tray 111 to rotate together with the output tray 111.

When the user opens the output tray 111 to the open position, as shown in FIG. 6B, the holding member 113 rotates to the retracted position without interfering with the output tray 111, allowing the user to access the supply port 112. In this embodiment, the center of gravity 113*m* of the holding member 113 at the retracted position is located between the rotation shaft 113*e* of the holding member 113 and the rotation shaft 111*g* of the output tray 111 in the discharge direction D1. This positional relationship allows the holding member 113 to return to the original position under its own weight when the user closes the output tray 111.

Holding Configuration of Output Tray

Figure 7A:
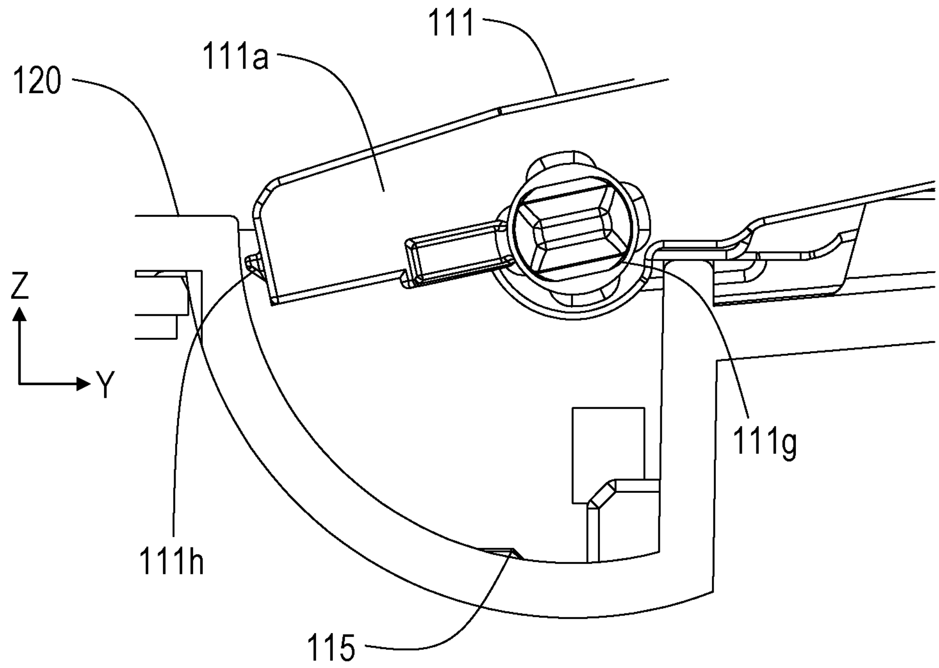
FIGS. 7A and 7B are diagrams illustrating an output-tray holding mechanism.
Figure 7B:
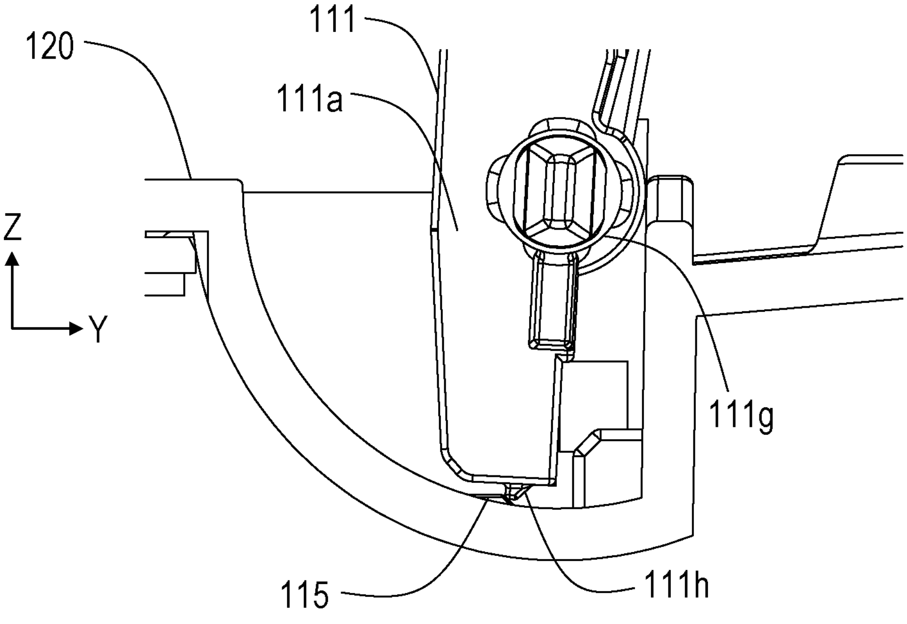

FIGS. 7A and 7B are enlarged cross-sectional views of the vicinity of the rotation shaft 111*g* of the output tray 111. When the user opens the output tray 111, the output tray 111 is held at the open position substantially perpendicular to a horizontal plane. As shown in FIG. 7A, the first output tray 111*a* includes a protrusion 111*h* (an engaging portion), and the apparatus main body 120 includes a protrusion 115 (an engaged portion).

As the user opens the output tray 111, the protrusion 111*h* climbs over the protrusion 115 at a certain point in time. At that time, the user is given a tactile feel, and the output tray 111 is held to keep the state. FIG. 7B illustrates a state in which the protrusion 111*h* has climbed over the protrusion 115, where the output tray 111 is at the open position. In other words, the protrusion 111*h* of the first output tray 111 and the protrusion 115 of the apparatus main body 120 engage with each other to function as a tray holding unit that holds the output tray 111 at the open position.

Rotation Range of Holding Member

Figure 8:
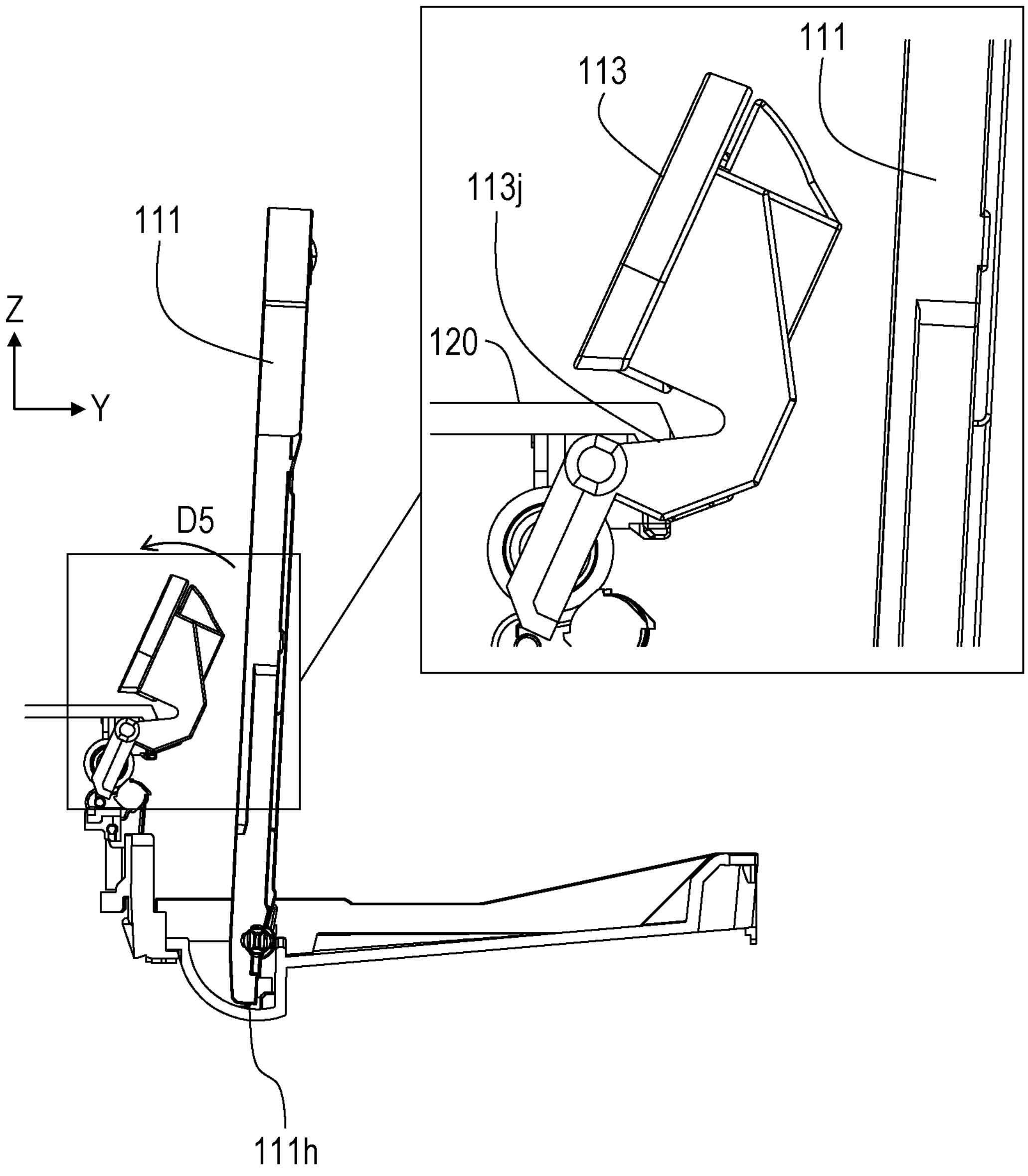
FIG. 8 is a diagram illustrating the rotation range of the holding member.

FIG. 8 illustrates a state in which the holding member 113 has further rotated in the direction of arrow D5, with the output tray 111 located at the open position. The holding member 113 is configured to further rotate from the retracted position shown in FIG. 6B to the position where an abutment portion 113*j* butts part of the apparatus main body 120. This configuration allows the protrusion 111*h* to reliably climb over the protrusion 115 (see FIGS. 7A and 7B) when the output tray 111 is opened, preventing an issue in opening the output tray 111.

Discharging Sheet with Output Tray Opened

Figure 9A:
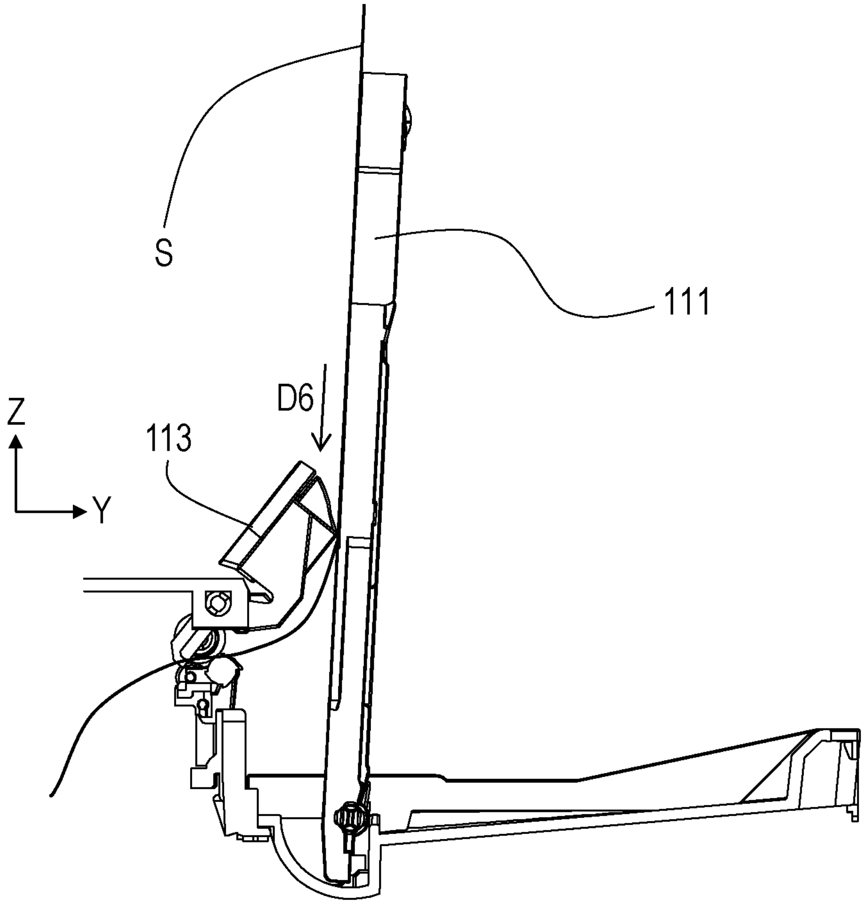
FIGS. 9A and 9B are diagrams illustrating a state in which a sheet is discharged with the output tray at the open position.
Figure 9B:
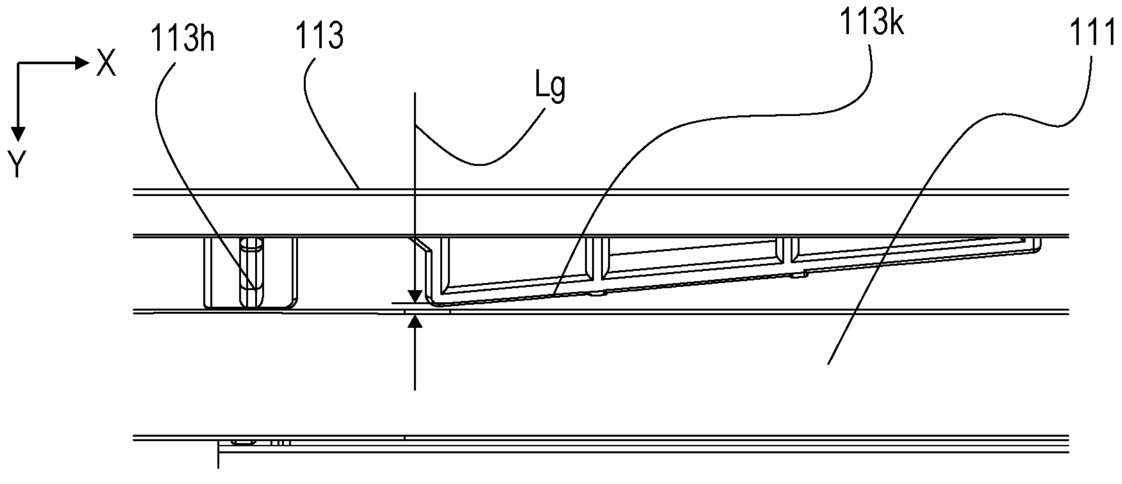

FIGS. 9A and 9B illustrate a state in which the sheet S is discharged with the output tray 111 at the open position. With the configuration of this embodiment, even if the output tray 111 is opened, only the supply port 112 is exposed, and the sheet-S conveying path and the process members for image formation are not exposed. This configuration allows the image forming operation to be continued even if the output tray 111 is open.

FIG. 9A is a left side view of the vicinity of the output tray 111. FIG. 9B is an enlarged view of a portion at which the output tray 111 and the holding member 113 are in contact, as viewed in the direction of arrow D6 in FIG. 9A. As shown in FIG. 9B, the output tray 111 and the holding member 113 are in contact at the contact portion 113*h*, and there is a gap Lg between the sheet holding surface 113*k* and the sheet S load surface of the output tray 111.

The presence of the gap Lg allows the sheet S discharged by mistake, with the output tray 111 opened, to be discharged onto the output tray 111 without jamming, as shown in FIG. 9A. Furthermore, the contact portions 113*h* are disposed outside the sheet-S conveying area, as described above, not interfering with discharge of the sheet S.

Thus, this embodiment prevents the output tray 111 and the holding member 113 from interfering with each other when the output tray 111 is opened, allowing the output tray 111 to be opened sufficiently wide. This makes it easy for the user to access the supply port 112, improving the usability. Furthermore, since the holding member 113 has a simple configuration in which it rotates in contact with the output tray 111 in the same direction, there is no need to provide a space for containing the holding member 113 in the apparatus main body 120, preventing an increase in the size of the apparatus.

Second Embodiment

This embodiment is characterized in a configuration in which a rotatable member is provided at the contact portion between the output tray and the holding member. Since the configuration of this embodiment is the same as that of the first embodiment except the features of this embodiment described below, the description thereof will be omitted.

Configuration of Holding Member

Figure 10A:
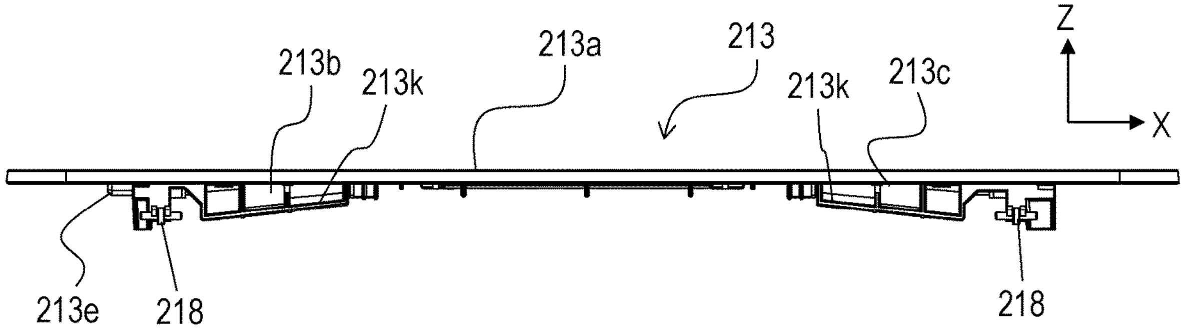
FIGS. 10A to 10C are diagrams illustrating the configuration of a holding member according to a second embodiment.
Figure 10B:
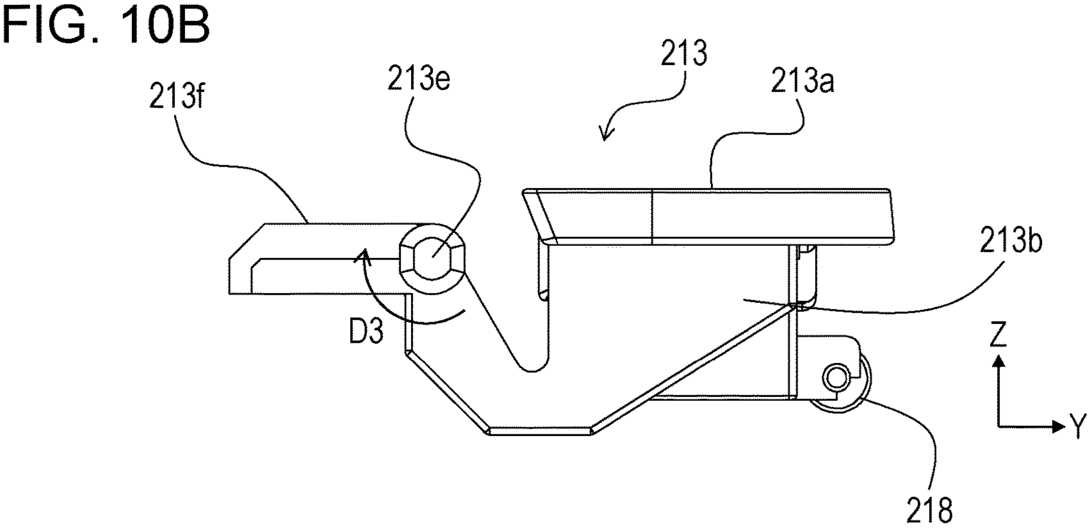
Figure 10C:
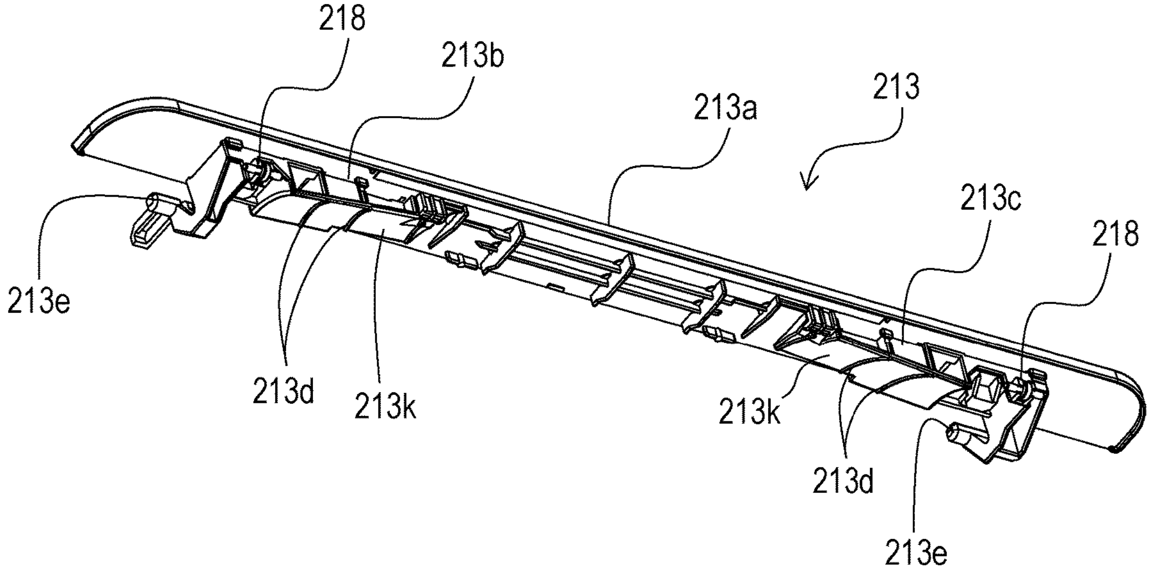

FIGS. 10A to 10C are diagrams for illustrating the configuration of a holding member 213 of this embodiment. FIG. 10A is a front view of the holding member 213. FIG. 10B is a left side view of the holding member 213. FIG. 10C is a perspective view of the holding member 213.

As shown in FIG. 10A, the holding member 213 includes three components, a first holding member 213*a*, a second holding member 213*b*, and a third holding member 213*c*.

The second and third holding members 213*b* and 213*c* each have a sheet holding surface 213*k*, on which several ribs 213*d* with a height of about 1 mm protruding therefrom are provided, as in the first embodiment, as shown in FIG. 10C.

As shown in FIG. 10B, the holding member 213 is rotatably supported by the apparatus main body 120 (not shown in FIG. 10C) about rotation shafts 213*e* (a second rotation shaft). The second and third holding members 213*b* and 213*c* each have a rotation stopper 213*f* to restrict the rotation range of the holding member 213. The second and third holding members 213*b* and 213*c* each have a rotatable member 218, unlike the configuration of the first embodiment. The rotatable member 218 can freely rotate following a contacted member.

Configuration in which Output Tray and Holding Member Rotate Cooperatively

Next, how the output tray 111 and the holding member 213 rotate together will be described.

Figure 11A:
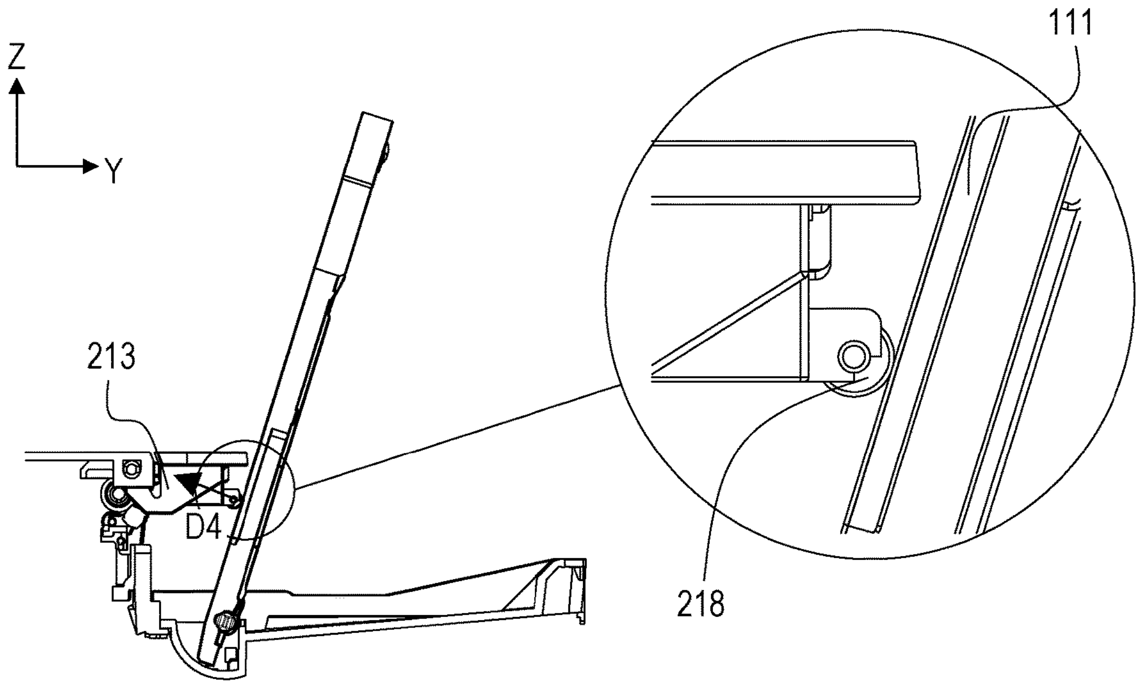
FIGS. 11A and 11B are diagrams illustrating a state in which the output tray and the holding member of the second embodiment rotate together.
Figure 11B:
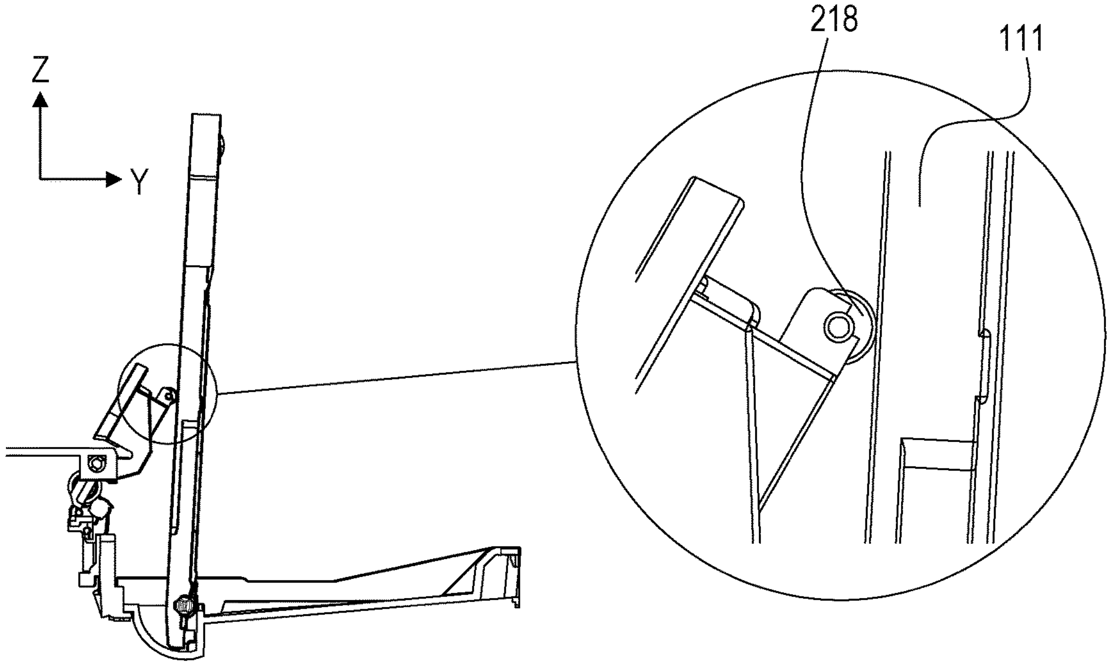

FIG. 11A illustrates a state in which the output tray 111 comes into contact with the holding member 213 in the process of rotation from the closed position to the open position. FIG. 11B illustrates a state in which the output tray 111 is opened to the open position.

When the user rotates the output tray 111, the output tray 111 comes into contact with the rotatable member 218 of the holding member 213, as shown in FIG. 11A. The holding member 213 is given a force in the direction of arrow D4 by the output tray 111 to rotate together with the output tray 111. The rotation of the rotatable member 218 decreases the sliding resistance between the output tray 111 and the holding member 213. Since the configuration of the holding mechanism for holding the output tray 111 at the open position, shown in FIG. 11B, is the same as that of the first embodiment, the description thereof will be omitted.

Thus, even if the user opens the output tray 111 to repeatedly bring the output tray 111 into contact with the holding member 213, this embodiment reduces the possibility that the output tray 111 is given a friction flaw or the like.

In this embodiment, the rotatable members 218 are disposed outside the sheet-S conveying area in the width direction of the sheet S, as are the contact portions 113*h* described in the first embodiment. This is given for mere illustrative purposes. The rotatable members 218 may be disposed inside the sheet-S conveying area. Even if the sheet S is erroneously discharged with the output tray 111 opened to the open position, the rotatable members 218 rotate following the discharged sheet S, which reduces the possibility of causing an image defect, such as scraping the image formed on the sheet S.

Third Embodiment

This embodiment is characterized in a configuration in which the holding member includes a rotation detecting mechanism to detect the rotation of the holding member as well as the rotation of the output tray. Since the configuration of this embodiment is the same as that of the first embodiment except the features of this embodiment described below, the description thereof will be omitted.

Rotation Detecting Mechanism of Holding Member

Figure 12:
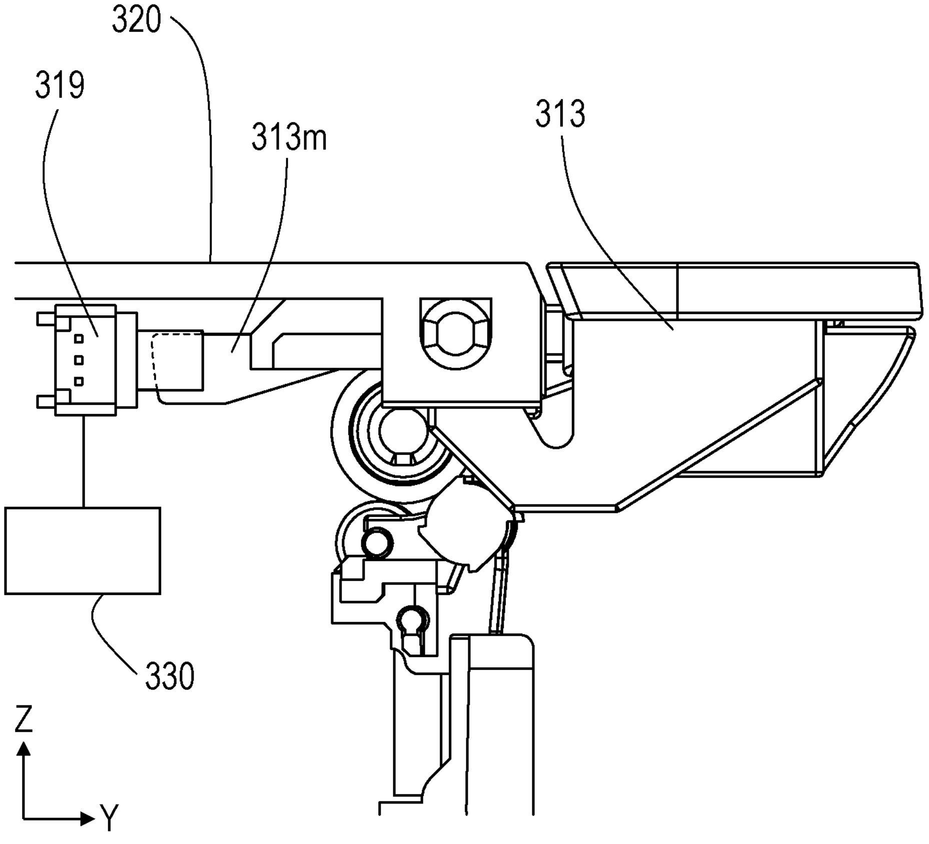
FIG. 12 is a diagram illustrating the rotation detecting mechanism of a holding member according to a third embodiment.

FIG. 12 illustrates the rotation detecting mechanism of a holding member 313 of this embodiment. The holding member 313 of this embodiment includes a flag 313*m* at an end. The apparatus main body 320 includes an optical sensor 319. The optical sensor 319 is a photo-interrupter, which outputs different signals to a control unit 330 according to whether the optical path is blocked by the flag 313*m*. The control unit 330 includes a central processing unit (CPU, not shown), which performs various determination processes on the basis of a signal received from the optical sensor 319.

Figure 13:
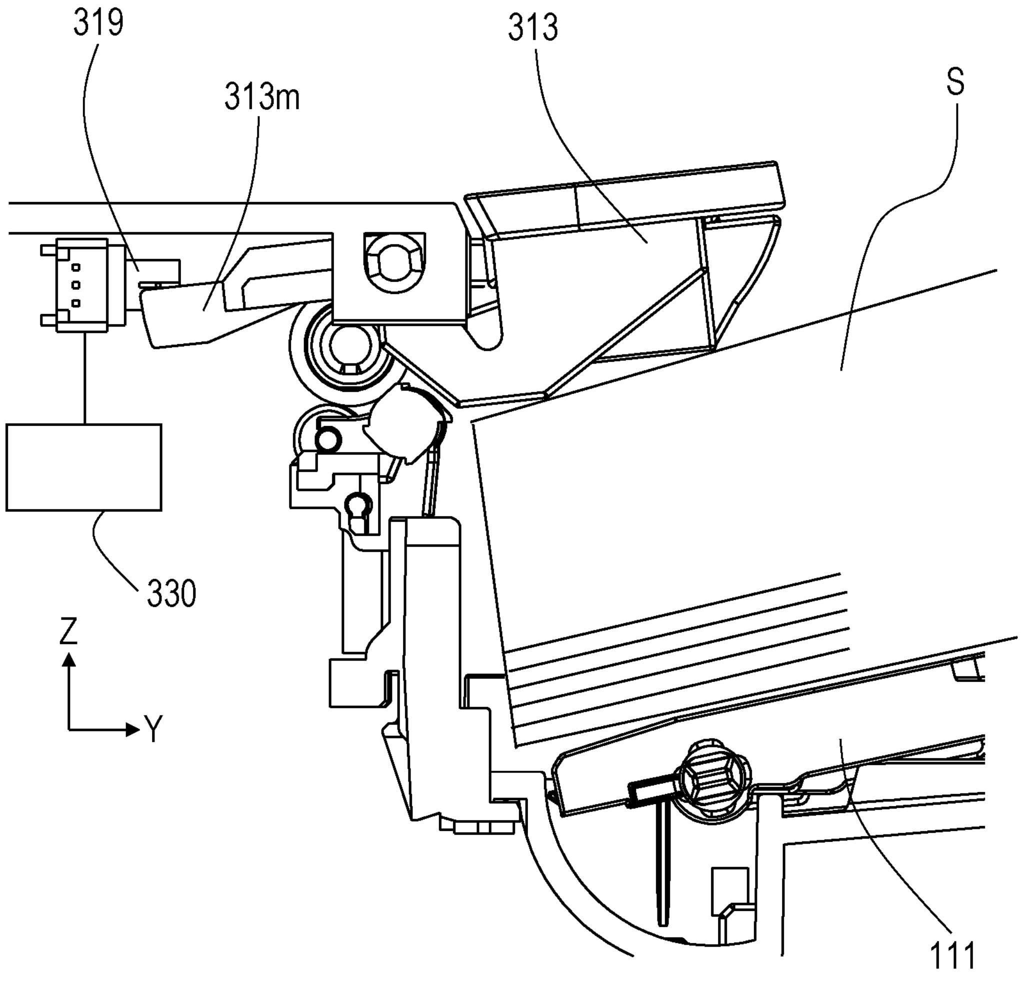
FIG. 13 is a diagram illustrating a state in which the output tray is in full load in the third embodiment.

FIG. 13 illustrate a state in which a large amount of sheets S are discharged onto the output tray 111, so that the output tray 111 is in full load. At the full load, the holding member 313 is raised to move the flag 313*m*. This causes the optical sensor 319 to transmit light, thereby allowing the control unit 330 to determine that the output tray 111 is in full load according to the detection result. At the full load condition, the control unit 330 stops further image formation and prevents the sheet S from being discharged onto the output tray 111. The control unit 330 displays a message that the output tray 111 is in full load on an operation panel (not shown) or the screen of an external device (a personal computer), thereby notifying the user of the full load. This prevents a jam caused by the discharge of the sheet S.

Configuration in which Output Tray and Holding Member Rotate Cooperatively

Figure 14:
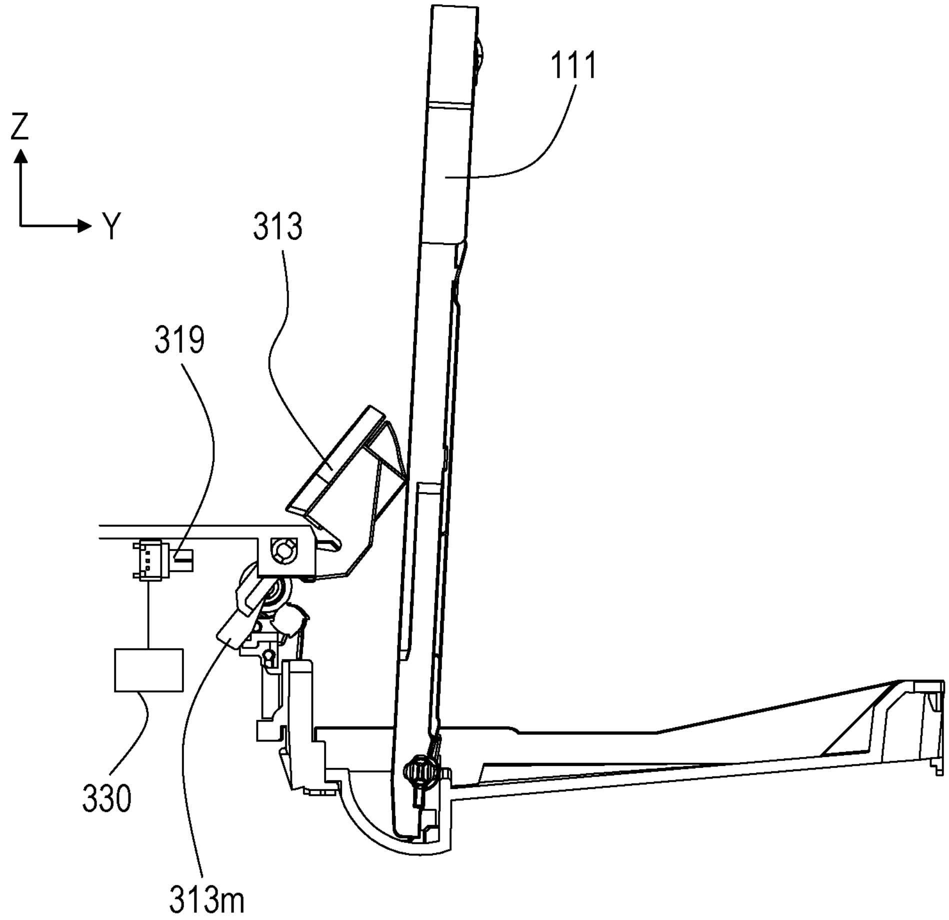
FIG. 14 is a diagram illustrating a state in which the output tray is at the open position in the third embodiment.

Also in this embodiment, the holding member 313 is rotated in cooperation with the rotation of the output tray 111, as in the first embodiment. FIG. 14 illustrates a state in which the output tray 111 is opened to the open position. When the output tray 111 is opened to the open position, the optical sensor 319 enters a light transmissive state.

The control unit 330 determine whether the output tray 111 is open by checking a signal from the optical sensor 319.

With this configuration, the control unit 330 cannot uniquely determine whether the output tray 111 is in a full load state or is open when the optical sensor 319 has changed from a light blocked state to a light transmissive state. For this reason, the optical sensor 319 may be disposed at a plurality of locations to detect the inclination angle of the holding member 313, thereby allowing the control unit 330 to uniquely determine whether the output tray 111 is in a full load state or is open.

When the light transmissive state of the optical sensor 319 is detected while an image forming operation is not being performed, the control unit 330 can uniquely determine that the output tray 111 is open. In contrast, when the light transmissive state of the optical sensor 319 is detected during the image forming operation, the control unit 330 may determine that the output tray 111 is likely full.

Thus, this embodiment includes the rotation detecting mechanism for the holding member 313 so as to detect the full load state of the output tray 111, thereby detecting the open state of the output tray 111. This eliminates the need for a sensor dedicated to detection of the open state of the output tray 111, thereby reducing the cost.

In the first to third embodiments, the protrusion 111*h* of the output tray 111 and the protrusion 115 of the apparatus main body 120 engage with each other to hold the output tray 111 at the open position, as shown in FIGS. 7A and 7B. However, this is given for illustrative purposes only.

Figure 15A:
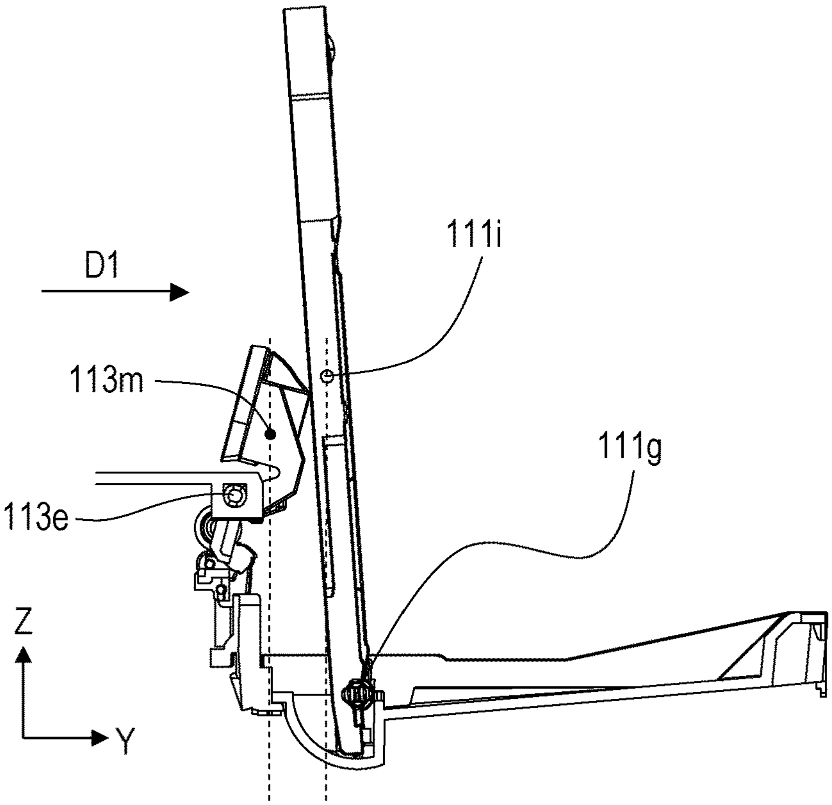
FIGS. 15A and 15B are diagrams illustrating the open position of the output tray in a modification.

For example, the output tray 111 may be configured to be opened wider than that of FIG. 6B, as shown in FIG. 15A. The center of gravity 111*i* of the output tray 111 at the open position may be located between the rotation shaft 113*e* of the holding member 113 and the rotation shaft 111*g* of the output tray 111 in the discharge direction D1. This configuration allows the output tray 111 to be kept at the open position because of its own weight, shown in FIG. 15A, even without the holding mechanism shown in FIGS. 7A and 7B.

In the first to third embodiments, the center of gravity 113*m* of the holding member 113 is located between the rotation shaft 113*e* of the holding member 113 and the rotation shaft 111*g* of the output tray 111 (downstream from the rotation shaft 113*e* and upstream from the rotation shaft 111*g*) in the discharge direction D1. However, this is provided for illustrative purposes only.

Figure 15B:
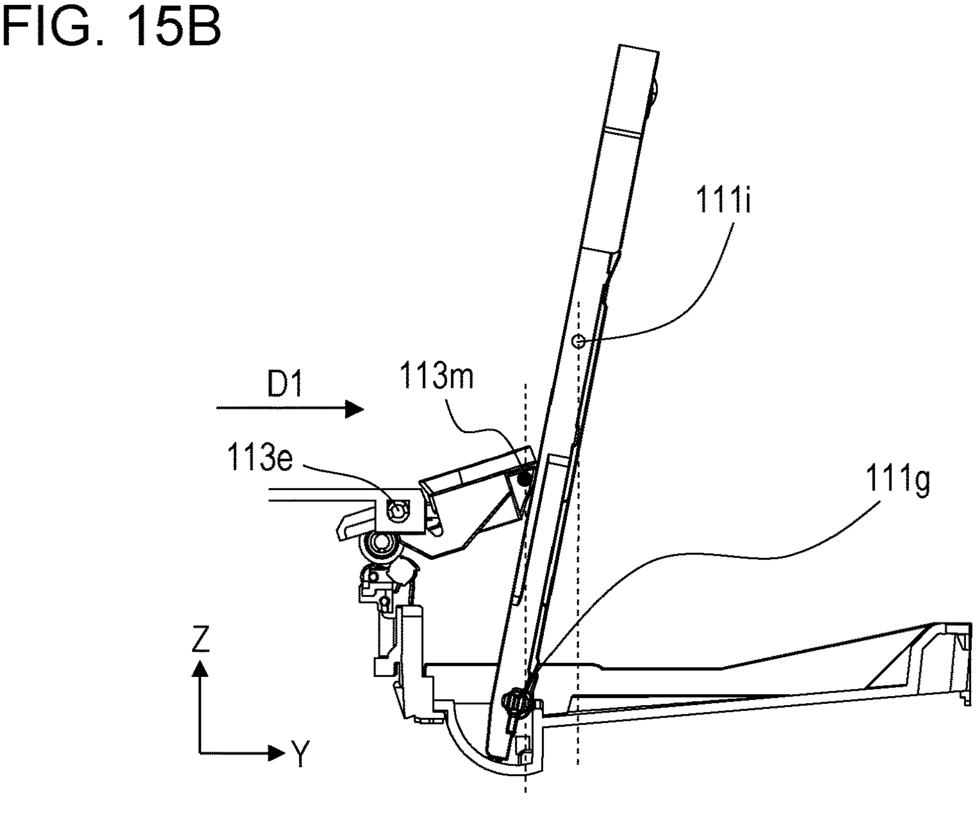

For example, as shown in FIG. 15B, the opening angle of the output tray 111 may be set smaller than that in FIG. 6B by increasing the force of the mechanism for holding the output tray 111 at the open position. The center of gravity 113*m* of the holding member 113 at the open position may be located downstream from the rotation shaft 111*g* of the output tray 111 in the discharge direction D1.

In FIG. 15B, the center of gravity 113*m* of the holding member 113 is located more downstream in the discharge direction D1 than in FIG. 6B and FIG. 15A. The position of the center of gravity 113*m* can be adjusted, for example, by weighting the end of the holding member 113.

The first to third embodiments use the supply-type image forming apparatus 100 for description. However, this is given for illustrative purposes only. The present disclosure may also be applied to a cartridge-replaceable image forming apparatus.

Figure 16:
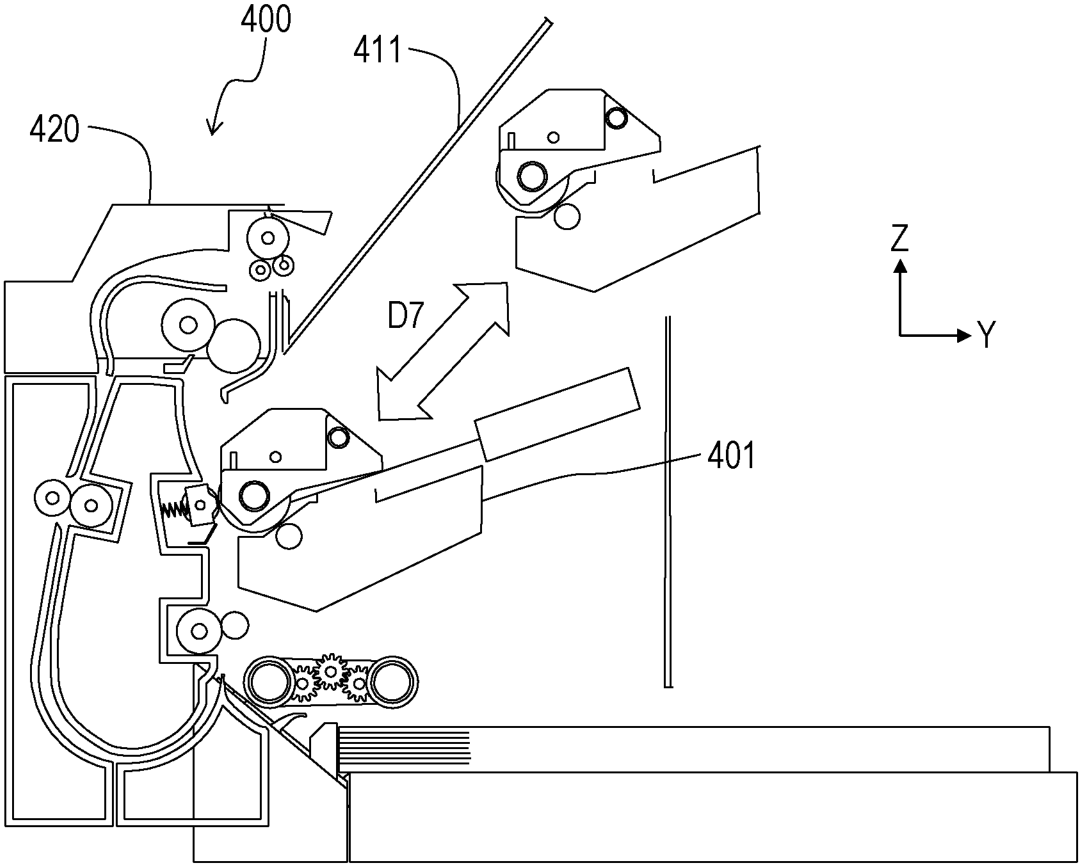
FIG. 16 is a cross-sectional view of a cartridge-replaceable image forming apparatus in a modification.

FIG. 16 is a cross-sectional view of a cartridge-replaceable image forming apparatus 400. The image forming apparatus 400 does not include the supply port 112. If the toner remaining in a process cartridge 401 has decreased or the life of process members, such as a drum, has expired, the user replaces the process cartridge 401.

The image forming apparatus 400 is configured such that the user can replace the process cartridge 401 when an output tray 411 is opened. The process cartridge 401 is detachably attached to the apparatus main body 420 in the direction of arrow D7. Opening the output tray 411 as wide as possible improves the usability in replacing the process cartridge 401.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-109226 filed Jun. 30, 2021, which is hereby incorporated by reference herein in its entirety.

What is claimed is:

1. An image forming apparatus comprising:

an apparatus main body including a discharge roller for discharging a recording material on which an image is formed;

an output tray configured to support the recording material discharged by the discharge roller; and a holding member configured to hold the recording material, from above in a vertical direction, when the recording material is being discharged by the discharge roller, wherein the output tray is rotatable with respect to the apparatus main body about a first rotation shaft extending in a crossing direction crossing a discharge direction in which the recording material is discharged by the discharge roller, wherein the output tray is rotatable between a closed position at which the output tray is closed with respect to the apparatus main body and an open position at which the output tray is open with respect to the apparatus main body, wherein the holding member is rotatable with respect to the apparatus main body about a second rotation shaft extending in the crossing direction, wherein the output tray comes into contact with the holding member halfway through rotation of the output tray from the closed position to the open position, and when the output tray is rotated to the open position, the holding member rotates to a retracted position while being in contact with the output tray, wherein, when viewed in the crossing direction, the first rotation shaft is located downstream from the second rotation shaft in the discharge direction, and a center of gravity of the holding member is located downstream from the second rotation shaft in the discharge direction when the holding member is at the retracted position, and wherein, the holding member including a surface which is inclined in the crossing direction.

2. The image forming apparatus according to claim 1, wherein the surface has a rib protruding from the surface and coming into contact with the recording material which is being discharged by the discharge roller.

3. The image forming apparatus according to claim 1, wherein, when viewed in the crossing direction, the center of gravity of the holding member is located upstream from the first rotation shaft in the discharge direction when the holding member is at the retracted position.

4. The image forming apparatus according to claim 3, wherein, when viewed in the crossing direction, a center of gravity of the output tray is located downstream from the first rotation shaft in the discharge direction when the holding member is at the retracted position.

5. The image forming apparatus according to claim 3, wherein, when viewed in the crossing direction, a center of gravity of the output tray is located upstream from the first rotation shaft in the discharge direction when the holding member is at the retracted position.

6. The image forming apparatus according to claim 1, wherein, when viewed in the crossing direction, the center of gravity of the holding member is located downstream from the first rotation shaft in the discharge direction when the holding member is at the retracted position.

7. The image forming apparatus according to claim 6, wherein, when viewed in the crossing direction, a center of gravity of the output tray is located downstream from the first rotation shaft in the discharge direction when the holding member is at the retracted position.

8. The image forming apparatus according to claim 1, further comprising a tray holding unit configured to hold the output tray so as to maintain the output tray at the open position, wherein the tray holding unit includes an engaging portion at the output tray and an engaged portion provided at the apparatus main body, and wherein the engaged portion and the engaging portion are configured to engage with each other to maintain the output tray at the open position.

9. The image forming apparatus according to claim 1, wherein the holding member includes a contact portion configured to come into contact with the output tray, and wherein the contact portion is disposed outside a recording-material conveying area in a width direction of the recording material crossing the discharge direction.

10. The image forming apparatus according to claim 1, wherein the holding member includes a rotatable member configured to come into contact with the output tray.

11. The image forming apparatus according to claim 1, further comprising:

a detecting unit configured to detect rotation of the holding member; and a determination unit configured to determine, when the detecting unit detects the rotation of the holding member, that the output tray is open with respect to the apparatus main body.

12. The image forming apparatus according to claim 11, wherein the determination unit is configured to determine, when the detecting unit detects the rotation of the holding member while the recording material is being discharged to the output tray, that the output tray is in full load.

13. The image forming apparatus according to claim 1, further comprising a supply port to which a supply container containing a developer is attachable, wherein the supply port is exposable outside the apparatus main body by opening the output tray with respect to the apparatus main body.

14. The image forming apparatus according to claim 1, further comprising a cartridge detachably attached to the apparatus main body, wherein the cartridge is replaceable by opening the output tray with respect to the apparatus main body.

15. An image forming apparatus comprising:

an apparatus main body including a discharge roller for discharging a recording material on which an image is formed;

an output tray configured to support the recording material discharged by the discharge roller;

a holding member configured to hold the recording material, from above in a vertical direction, when the recording material is being discharged by the discharge roller; and a tray holding unit configured to hold the output tray so as to maintain the output tray at an open position, wherein the output tray is rotatable with respect to the apparatus main body about a first rotation shaft extending in a crossing direction crossing a discharge direction in which the recording material is discharged by the discharge roller, wherein the output tray is rotatable between a closed position at which the output tray is closed with respect to the apparatus main body and the open position at which the output tray is open with respect to the apparatus main body, wherein the holding member is rotatable with respect to the apparatus main body about a second rotation shaft extending in the crossing direction, wherein the output tray comes into contact with the holding member halfway through rotation of the output tray from the closed position to the open position, and when the output tray is rotated to the open position, the holding member rotates to a retracted position while being in contact with the output tray, wherein the holding member is rotated by its own weight from the retracted position to an original position at which the holding member is not in contact with the output tray as the output tray is rotated from the open position to the closed position, wherein the tray holding unit includes an engaging portion at the output tray and an engaged portion provided at the apparatus main body, wherein the engaged portion and the engaging portion are configured to engage with each other to maintain the output tray at the open position, and wherein, the holding member including a surface which is inclined in the crossing direction.

16. The image forming apparatus according to claim 15, wherein the surface has a rib protruding from the surface and coming into contact with the recording material which is being discharged by the discharge roller.

17. The image forming apparatus according to claim 15, wherein the holding member includes a contact portion configured to come into contact with the output tray, and wherein the contact portion is disposed outside a recording-material conveying area in a width direction of the recording material crossing the discharge direction.

18. The image forming apparatus according to claim 15, wherein the holding member includes a rotatable member configured to come into contact with the output tray.

19. The image forming apparatus according to claim 15, further comprising:

a detecting unit configured to detect rotation of the holding member; and a determination unit configured to determine, when the detecting unit detects the rotation of the holding member, that the output tray is open with respect to the apparatus main body.

20. The image forming apparatus according to claim 19, wherein the determination unit is configured to determine, when the detecting unit detects the rotation of the holding member while the recording material is being discharged to the output tray, that the output tray is in full load.

21. The image forming apparatus according to claim 15, further comprising a supply port to which a supply container containing a developer is attachable, wherein the supply port is exposable outside the apparatus main body by opening the output tray with respect to the apparatus main body.

22. The image forming apparatus according to claim 15, further comprising a cartridge detachably attached to the apparatus main body, wherein the cartridge is replaceable by opening the output tray with respect to the apparatus main body.

23. An image forming apparatus comprising:

an apparatus main body including a discharge roller for discharging a recording material on which an image is formed;

an output tray configured to support the recording material discharged by the discharge roller; and a holding member configured to hold the recording material, from above in a vertical direction, when the recording material is being discharged by the discharge roller, wherein the output tray is rotatable with respect to the apparatus main body about a first rotation shaft extending in a crossing direction crossing a discharge direction in which the recording material is discharged by the discharge roller, wherein the output tray is rotatable between a closed position at which the output tray is closed with respect to the apparatus main body and an open position at which the output tray is open with respect to the apparatus main body, wherein the holding member is rotatable with respect to the apparatus main body about a second rotation shaft extending in the crossing direction, wherein the output tray starts to come into contact with the holding member at a first position between the closed position and the open position when the output tray is rotated from the closed position to the open position, wherein when the output tray comes into contact with the holding member, the holding member rotates about the second rotation shaft, wherein when the output tray is rotated from the first position to the open position, the holding member rotates to the retracted position about the second rotation shaft while being in contact with the output tray, wherein, when viewed in the crossing direction, the first rotation shaft is located downstream from the second rotation shaft in the discharge direction, and a center of gravity of the holding member is located downstream from the second rotation shaft in the discharge direction when the holding member is at the retracted position, and wherein, the holding member including a surface which is inclined in the crossing direction.

24. The image forming apparatus according to claim 23, wherein the surface has a rib protruding from the surface and coming into contact with the recording material which is being discharged by the discharge roller.

25. The image forming apparatus according to claim 23, further comprising a tray holding unit configured to hold the output tray so as to maintain the output tray at the open position, wherein the tray holding unit includes an engaging portion at the output tray and an engaged portion provided at the apparatus main body, and wherein the engaged portion and the engaging portion are configured to engage with each other to maintain the output tray at the open position.

26. The image forming apparatus according to claim 23, wherein the holding member includes a contact portion configured to come into contact with the output tray, and wherein the contact portion is disposed outside a recording-material conveying area in a width direction of the recording material crossing the discharge direction.

27. The image forming apparatus according to claim 23, further comprising a supply port to which a supply container containing a developer is attachable, wherein the supply port is exposable outside the apparatus main body by opening the output tray with respect to the apparatus main body.

28. The image forming apparatus according to claim 23, further comprising a cartridge detachably attached to the apparatus main body, wherein the cartridge is replaceable by opening the output tray with respect to the apparatus main body.

* * * * *